(12) United States Patent
Lesser et al.

(10) Patent No.: US 6,557,726 B2
(45) Date of Patent: May 6, 2003

(54) ARRANGEMENT OF FASTENING ELEMENTS FOR HOLDING BUNDLES RETAINED BY CABLE TIES

(75) Inventors: Hans-Jurgen Lesser, Rheinfelden (DE); Martin Busch, Efringen-Kirchen (DE); Hartmut Jackle, Laufenberg-Luttingen (DE)

(73) Assignee: A. Raymond & Cie (FR)

( * ) Notice: Subject to any disclaimer, the term of this patent is extended or adjusted under 35 U.S.C. 154(b) by 0 days.

(21) Appl. No.: 10/230,918

(22) Filed: Aug. 29, 2002

(65) Prior Publication Data

US 2002/0195829 A1 Dec. 26, 2002

Related U.S. Application Data

(62) Division of application No. 09/720,110, filed as application No. PCT/EP99/04145 on Jun. 16, 1999, now Pat. No. 6,467,650.

(30) Foreign Application Priority Data

Jun. 24, 1998 (DE) .......................................... 198 28 007

(51) Int. Cl.[7] .................................................. B23Q 7/04
(52) U.S. Cl. .................................... 221/208; 24/16 PB
(58) Field of Search .......................... 221/277, 208–258, 221/268; 24/16 PB, 16 R, 17 R

(56) References Cited

U.S. PATENT DOCUMENTS 4,640,320 A * 2/1987 Avison et al. ............ 140/93 A
5,119,528 A 6/1992 Tomohiro et al.

FOREIGN PATENT DOCUMENTS

EP 0303 723 A 2/1989

* cited by examiner

*Primary Examiner*—Kenneth W. Noland
(74) *Attorney, Agent, or Firm*—Gifford, Krass, Groh, Sprinkle, Anderson & Citkowski, P.C.

(57) ABSTRACT

The present invention provides an arrangement of fastening elements for holding bundles retained by cable ties, and a method therefor. The arrangement of elements includes a pair of strips removably attached to a sequence of fastening elements, whereby the pair of strips facilitate the transport, readying, and positioning of each fastening element prior to interaction with the cable tie. Also provided is a method for molding the arrangement of cable ties in which the cable ties are advantageously used for retaining bundles of cables, pipes, and similarly elongated items.

6 Claims, 3 Drawing Sheets

FIG. 1
FIG. 2
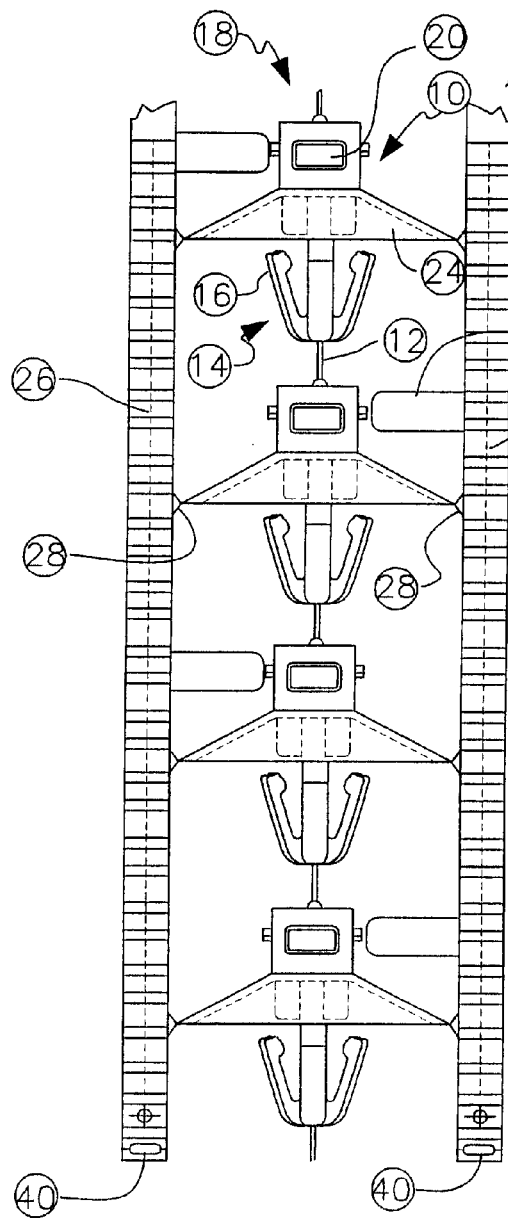
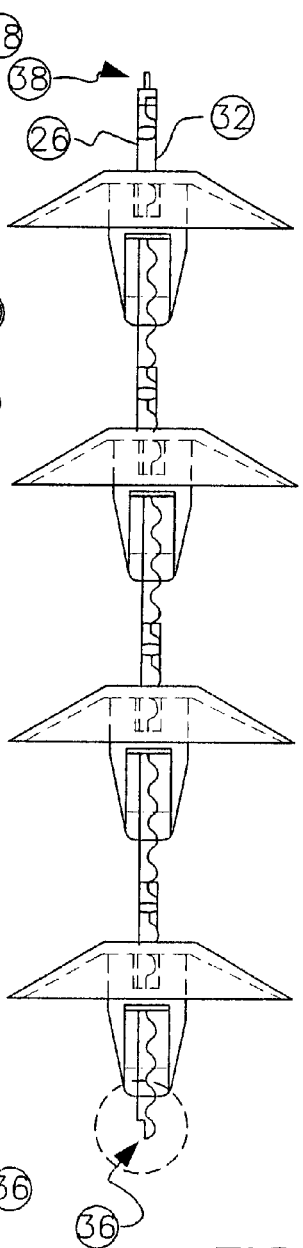
FIG. 3
FIG. 4
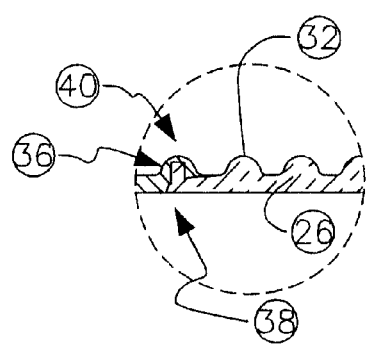
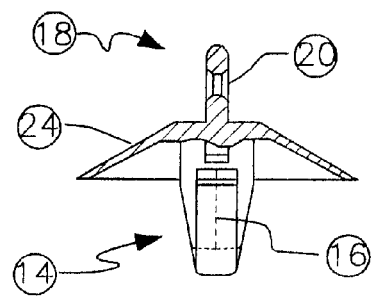

ARRANGEMENT OF FASTENING ELEMENTS FOR HOLDING BUNDLES RETAINED BY CABLE TIES

CROSS REFERENCE TO RELATED APPLICATIONS

This is a divisional of U.S. Ser. No. 09/720,110, filed Dec. 18, 2000 now U.S. Pat. No. 6,467,650 which claims priority from PCT Application No. PCT/EP99/04145, filed Jun. 16, 1999, and German Application No. 198 28 007.6, filed Jun. 24, 1998, and are hereby incorporated by reference.

FIELD OF THE INVENTION

The invention pertains to an arrangement of fastening elements for holding bundles retained by cable ties, as well as a process for arranging fastening elements in a row in which the cable ties are advantageously used for retaining bundles of cables, pipes and similarly elongated items. The locking components for the cable ties can be joined in one piece with their leader or designed as separate pieces which—as in the case of the binding device according to EPS 0 565 968—are connected to the ends drawn from a roll of continuous cable tie.

BACKGROUND OF THE INVENTION

Following the assembly of the cables and the insertion and cinching of the cable tie in the locking component, a separate plastic fastening element should be used for retaining the bundle, as disclosed in DE 94 01 448 U1. For the positive threading of the cable tie, this fastening element has a holding loop with its fastening plate anchored on an appropriately formed support part. Here it has been shown to be advantageous when the threading of the cable tie into the holding loop and the positioning of the tie in the holding loop are manually accomplished by means of a pin. This operation, however, is not only time consuming (and therefore costly), but also requires dexterity.

The use of binding devices for processing continuous sequences of cable ties via automatic feed prior to interaction with locking components results in difficulties threading the cable tie through the holding loop of the fastening element, both before and after the assembly of the bundle of cables. Also, costly vibrator conveyors with appropriate guide channels are needed for the exact positioning element and the guiding in front of the tie exit opening of the binding device.

Accordingly, it is the objective of the invention to economically design and coordinate the fastening elements so that a supply of the fastening elements can be transported and positioned correctly for efficient processing in the binding device.

SUMMARY OF THE INVENTION

The present invention overcomes the issues of the prior and current art, and meets the aforementioned objectives with the design of the fastening elements and their pull-off union with strips. The pair of strips serves as the transport strips in the automatic operation. It is then possible for the fastening elements to be supplied to the binding device as a group in a position favoring further processing and, following their separation from the strips, to be favorably positioned for threading the cable tie.

In order to create better preconditions for the automatic processing of the fastening elements in the binding device, additional means such as a rack profile on one surface of each strip enhance the transport of the strips or make it possible for several groups of fastening elements arranged in rows to be combined in a chain of any desired length when injected in the casting mold and then subsequently rolled up, so that a great supply of fastening elements is available.

The foregoing examples represent several of the embodiments of the present invention; however, one skilled in the art will recognize that the examples in no way limit the invention disclosed herein.

Described in DE 41 05 460 C2 is a process for arranging cable binders in a so-called tie cluster for use in a binding device, in which the individual ties are end-bonded by injection. Here the bundling ties aligned one after the other in the longitudinal direction are connected by fusing their ends together in the molding tool, to then be separated again from each succeeding tie after being used in the binding device.

On the other hand, the ties fused together at their ends serve merely as transport adjuncts in the feed and automatic positioning of fastening elements arranged in a row and are not utilized in the binding of the cable bundles.

BRIEF DESCRIPTION OF THE DRAWINGS

FIG. 1 illustrates a top view of an arrangement of fastening elements according to the present invention, joined together by means of connectors and strips;

FIG. 2 illustrates a side view of the arrangements of fastening elements depicted in FIG. 1;

FIG. 3 illustrates a side view of a single fastening element with partial cross section view shown through the head and the collar;

FIG. 4 illustrates conjoined, stepwise offset ends of two successive strips;

DETAILED DESCRIPTION OF THE INVENTION

In accordance with the present invention, there is provided a preferred embodiment of an arrangement of fastening elements for holding bundles retained by cable ties, as well as a process for arranging fastening elements in a row, in which the cable ties are advantageously used for retaining bundles of cables, pipes, and similar elongated items.

Figure 5:
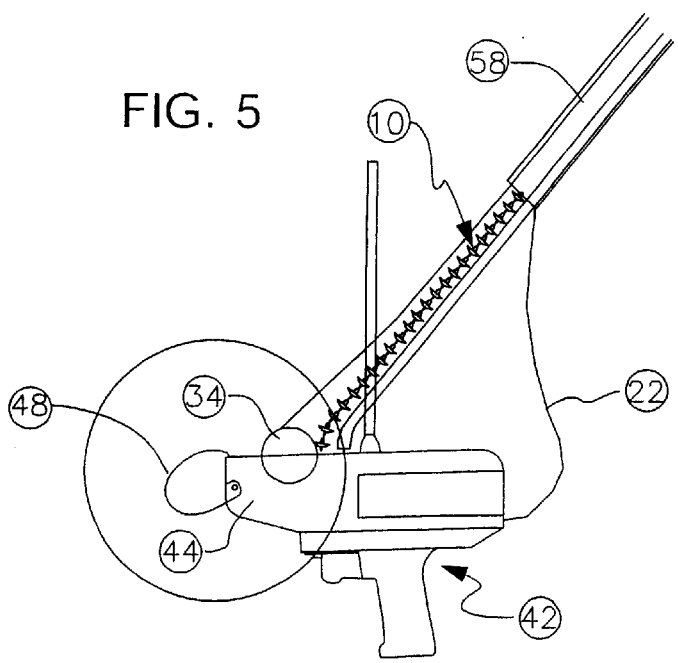
FIG. 5 illustrates a binding device having guide hasps for cable ties and automatic positioning of fastening elements arranged in a row.
Figure 6:
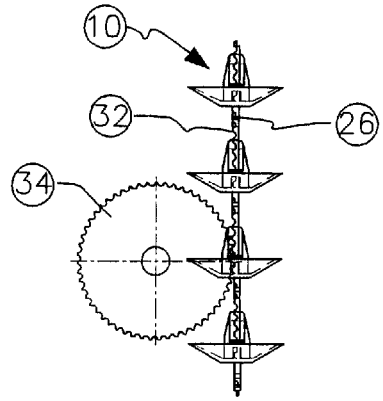
FIG. 6 illustrates a gearwheel drive for strips having a rack profile.

Referring now to the drawings wherein like numbers are used to denote like items throughout, FIGS. 1 and 2 show a plurality of fastening elements 10, which are arranged one after the other in a row and are joined together by a plurality of connectors 12. Each connector 12 in the plurality of connectors 12 removably detaches from its associated fastening elements 10. Each fastening element 10 includes a mounting portion 14, which is equipped with a pair of resilient legs 16 for anchoring in the hole of a fastening plate (not shown). Each fastening element 10 further includes a head 18 forming an aperture 20 therethrough; e.g., a cross-sectionally rectangular holding loop for the positive threading of a cable tie 22, shown hereinafter in FIG. 5. Between the head 18 and the mounting portion 14, there is a collar 24, which provides for flexible positioning of the fastening element 10 on an supporting plate (not shown).

On both sides of the collar 24 are molded a pair of strips 26, the strips 26 formed during the injection molding, while the molding material is directed into the collar 24 via a pair of links 28. Additional links 30 are provided between the pair of strips 26 and the heads 18 of the fastening elements 10 in order to ensure a rapid filling of the mold in the area of the head 18.

The pair of strips 26 running past the collar 24 on both sides provide the great advantage that, once the two halves of the casting mold have been removed, the pair of strips 26 remain connected to the collar 24 by the pair of links 28 in such a way that the pair of strips 26 can be used as transport strips in the ensuing readying of the fastening elements 10.

To this end, each strip 26 of the pair of strips 26 is provided with a rack profile 32 on one side, which can be driven by a comparably designed cogwheel 34 shown together with a binding device 42 in FIGS. 5-8. Furthermore, the pair of strips 26, as can be seen in FIG. 4, are stepwise offset at both ends, so that an offset end having a step 36 on the one end of the strip 26 fits together with an opposing end having opposing step 38, on the leading end of the following strip 26 to form a full cross-sectional strip. In order to connect together the strips 26 of a finished arrangement of fastening elements 10 with the leading portion of the strip 26 of the following arrangement of fastening elements 10, the leading end of each strip 26 is provided with a recess 40 therein in the area of the offset end having the step 36, which, in the production of the fastening element 10 groups according to the invention, serves as the receiver of the injection material of the succeeding strip 26.

Once the mold has been opened, the finished injection-molded fastening elements 10, together with their pair of strips 26, are lifted out of the casting mold. Then the pair of strips 26 with their recessed ends are positioned in a comparably formed casting mold so that, when the next fastening element 10 group is injection molded, the molding material for the pair of strips 26 penetrates into the recess 40 in the ends of the preceding pair of strips 26 remaining in the mold and fills them in such a way that both ends of both pairs of strips 26 remain immovably conjoined. In this manner, it is possible to injection mold as many connected groups of fastening elements 10 as desired, and to wind them into a roll for subsequent readying in the binding device 42, shown in FIG. 5.

As illustrated in FIGS. 5-9, the binding device 42 represents in its basic configuration ordinary binding devices with continuous feed of cable ties 22 of predetermined length, which are fed through a locking component 46; prepositioned in the front 44 of the binding device 42; passed around the cable bundle 48; reinserted into the locking component 46; tightened; and separated behind the locking component 46 by means of a cutter 50.

Figure 7:
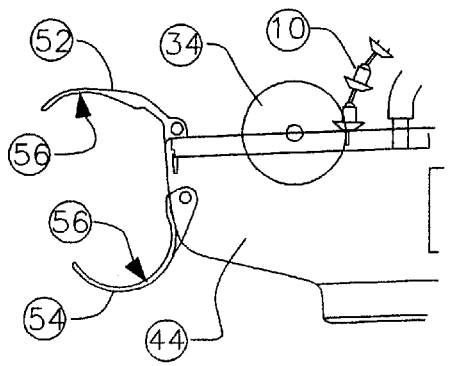
FIG. 7 illustrates an enlarged front of the binding device with open guide hasps.
Figure 8:
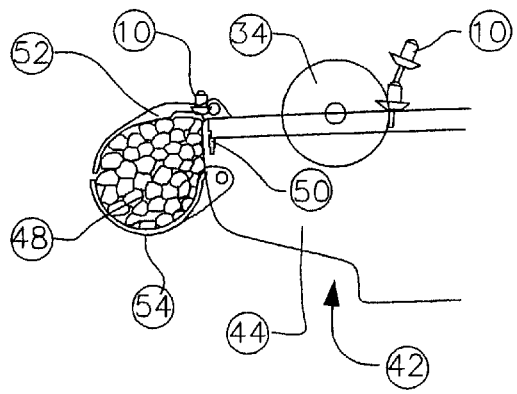
FIG. 8 illustrates the enlarged front of the binding device with closed guide hasps and an inserted bundle of cable, as well as a fastening element positioned beside the locking component.

Turning now to FIG. 7, there are shown two approximately semicircular guide hasps 52 and 54 respectively, for encircling the cable tie 22. The guide hasps 52 and 54 are pivotably mounted on the front 44 of the binding device 22. These are first shown in the open position in FIG. 7. After receiving the cable bundle 48 to be retained, the guide hasps 52 and 54 are pivoted together to provide on the inside a guide groove 56 for the introduced cable tie 22, by means of which the cable tie 22 is securely guided into the opening of the locking component 46 and there engaged in a known manner. Also located above the binding device 42 is a guide channel 58 (shown in FIG. 5), for the fastening elements 10 held together by connectors 12 and the pair of strips 26. Pivotably mounted on the lower end of the guide channel 58 is also a cogwheel 54, which engages in the rack profile 32 of the pair of strips 26, so that in each instance a fastening element 10 having a head 18 and an aperture 20 is initially drawn down (cf. FIG. 7).

Figure 10:
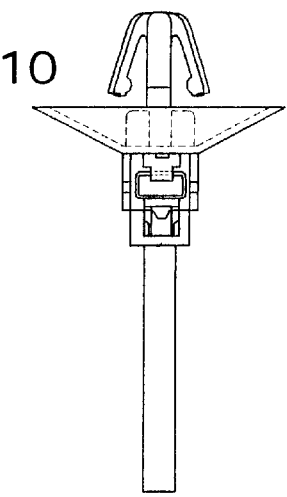
FIG. 10 illustrates a frontal view of the cable tie with the fastening element.
Figure 9:
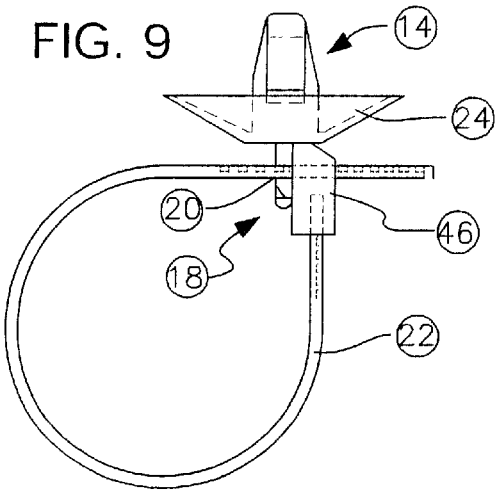
FIG. 9 illustrates a side view of a closed cable tie with a fastening element positioned in the tie loop.
Figure 11:
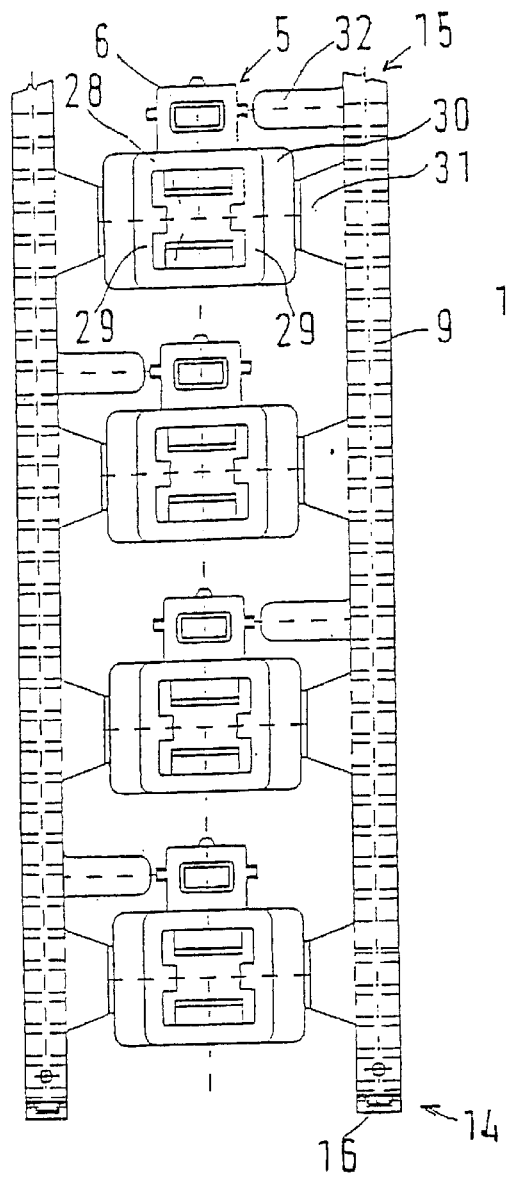
FIG. 11 illustrates a top view of another embodiment according to the present invention with an arrangement of fastening elements for securing threaded bolts, the fastening elements held together only by means of a pair of strips.
Figure 12:
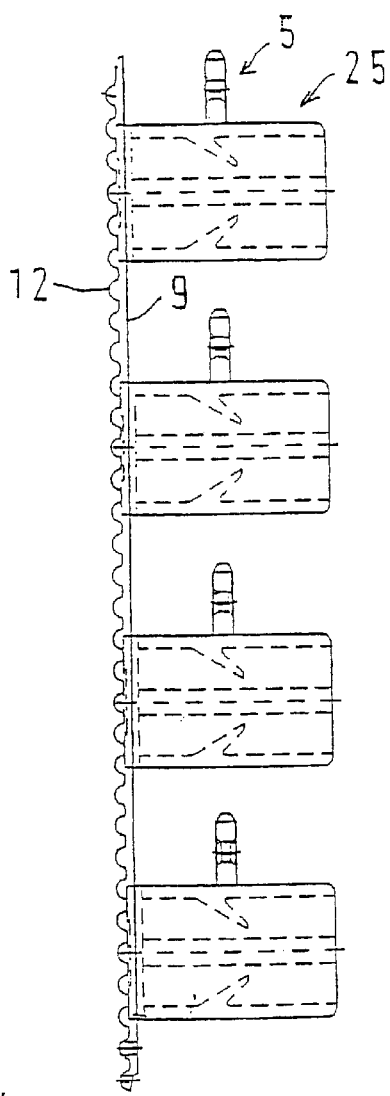
FIG. 12 illustrates a side view of the arrangement of fastening elements depicted in FIG. 11.
Figure 13:
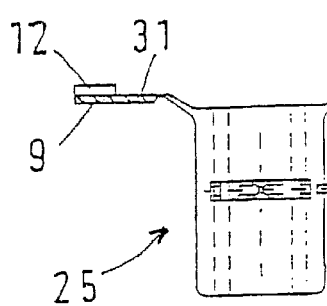
FIG. 13 illustrates a cross section of the pair of strips and the support flaps shown along line A in FIG. 11.
Figure 14:
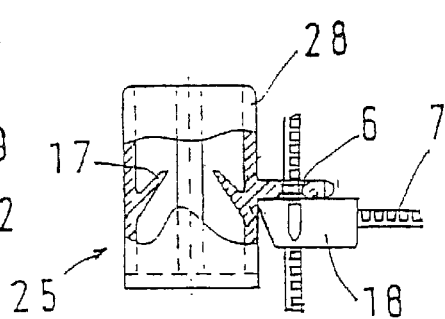
FIG. 14 illustrates a side view of the closed cable tie with a fastening element inside the tie loop.

For threading the cable ties 22 into the aperture 20 of the head 18, the fastening element 10 must be advanced by an displacement device (not shown), to a position in front of the exit opening of the front 44, and readied with the head 18 in front of the laterally advanced locking component 46. Then the cable tie 22 can be pushed through the locking component 46 and the head 18, through the guide groove 56 of the two guide hasps 52 and 54, and again into the locking component 46, where it is then engaged in a known manner (cf. FIGS. 9 and 10).

Depicted in FIGS. 11-14 is another embodiment of the present invention, in which the fastening elements 60 are designed for holding threaded bolts. The fastening elements 10 are held together only by the pair of strips 26. The fastening element 60 consists of a sleeve 62 having a pair of fingers 64, an outer wall 66, and an inner wall 68. The pair of fingers 64 are formed on the inner wall 68, and directed obliquely toward the middle, for engaging in the grooves of a threaded bolt (not shown). The sleeve 62 also includes a head 18 formed on the outer wall 66, and having an aperture 20 therethrough. The aperture 20 functions to facilitate the insertion of the cable tie 22 therethrough.

On the outer walls 66 offset thereto by 90°, laterally obliquely projecting support flaps 70 are formed, which provide a cushioned resting of the fastening elements 60 on the support part (not shown). The free edges of these support flaps 70 are connected by a pair of detachable flaps 76 to the pair of strips 26, which are provided with a rack profile 32 in the same manner as depicted in FIGS. 1, 2 and 4. Furthermore-exactly as in the preferred embodiment depicted in FIGS. 1 and 2—additional links 30 are provided between the pair of strips 26 and the heads 18 of the fastening elements 60, so as to ensure a rapid filling of the mold in the area of the head 18.

The description of the foregoing embodiments should be understood as encompassing only examples, and not restricted to the readying of fastening elements with heads for threading cable ties for holding cable bundles. Rather, the invention is applicable for all fastening elements that are to be readied for any automatically controlled mounting operations using strips as transport adjuncts for proper positioning.

We claim:

1. A method for transporting and readying an arrangement of fastening elements for processing with an associated plurality of cable ties, the arrangement of fastening elements having a pair of parallel strips and a plurality of fastening elements, each fastening element in the plurality of fastening elements removably attached to and disposed between the pair of parallel strips, the method comprising the steps of:

for each fastening element in the plurality of fastening elements:

feeding the pair of parallel strips along a predetermined path until one respective fastening element in the plurality of fastening elements is positioned correctly for processing with an associated cable tie in the plurality of cable ties;

detaching one respective fastening element in the plurality of fastening elements from the pair of parallel strips and from the remaining fastening elements in the plurality of fastening elements; and positioning the one respective fastening element in the plurality of fastening elements for receiving one respective cable tie in the plurality of cable ties.

2. A method for manufacturing an arrangement of fastening elements, the arrangement of fastening elements used to facilitate the transport and positioning of each fastening element in the arrangement, the method comprising the steps of:

molding the arrangement of fastening elements having a pair of parallel strips, each strip in the pair of parallel strips having an end portion; and a plurality of fastening elements having body and a head forming an aperture therein, the head extending from the body; each fastening element in the plurality of fastening elements disposed between the pair of parallel strips and removably attached to a respective strip in the pair of parallel strips; and opening the mold and removing the arrangement of fastening elements in such a way as to preserve the arrangement of fastening elements.

3. The method of claim 2, further comprising the steps of:

after removing the arrangement of fastening elements from the mold, placing the end portion of each strip in the pair of parallel strips in the arrangement of fastening elements back in the mold; and molding a succeeding arrangement of fastening elements such that each end portion of each strip in the pair of parallel strips in the arrangement of fastening elements immovably joins to one respective strip in the pair of parallel strips in the succeeding arrangement of fastening elements.

4. The method of claim 3, further comprising the steps of:

during the molding step for the arrangement of fastening elements, molding an end portion having a recess therein in each strip in the pair of parallel strips;

during the step of placing an end portion of each strip in the parallel pair of strips in the arrangement of fastening elements back in the mold, placing the end portion having the recess therein in each strip in the parallel pair of strips back in the mold; and during the step of molding a succeeding arrangement of fastening elements, filling the recess of each end portion in the mold of each strip in the pair of parallel strips in the arrangement of fastening elements with a material whereby each end portion of each strip in the pair of parallel strips in the arrangement of fastening elements immovably joins to one respective strip in the pair of parallel strips in the succeeding arrangement of fastening elements.

5. The method of claim 4, wherein the material further comprises plastic.

6. The method of claim 2, wherein each strip in the pair of parallel strips further comprises a surface having a rack profile thereon.

* * * * *

UNITED STATES PATENT AND TRADEMARK OFFICE
CERTIFICATE OF CORRECTION

PATENT NO. : 6,557,726 B2
DATED : May 6, 2003
INVENTOR(S) : Lesser et al.

It is certified that error appears in the above-identified patent and that said Letters Patent is hereby corrected as shown below:

Column 1,
Line 16, after "row" insert -- , --.
Line 36, replace "time consuming" with -- time-consuming --.

Column 4,
Line 21, replace "54" with -- 34 --.

Column 5,
Line 32, replace "having body" with -- having a body --.

Signed and Sealed this

Seventh Day of October, 2003

JAMES E. ROGAN
*Director of the United States Patent and Trademark Office*